United States Patent
Gusler et al.

(12) 
(10) Patent No.: US 6,446,085 B1
(45) Date of Patent: Sep. 3, 2002

(54) METHOD AND APPARATUS FOR PROCESSING RECURSIVE HARD LINKS IN A DATA PROCESSING SYSTEM

(75) Inventors: Carl Phillip Gusler; Rick A. Hamilton, II, both of Austin; Maulin Ishwarbhai Patel, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,292

(22) Filed: Jun. 17, 1999

(51) Int. Cl.$^7$ .............................................. G06F 17/00
(52) U.S. Cl. .................... 707/200; 707/202; 707/205
(58) Field of Search ................. 707/1–206; 709/200, 709/100, 332

(56) References Cited

U.S. PATENT DOCUMENTS

| | | | |
|---|---|---|---|
| 5,193,183 A | 3/1993 | Bachman | 707/1 |
| 5,546,571 A | 8/1996 | Shan et al. | 707/1 |
| 5,758,340 A | * 5/1998 | Nail | 707/9 |
| 5,758,356 A | * 5/1998 | Hara et al. | 707/202 |
| 5,787,427 A | * 7/1998 | Benantar et al. | 707/9 |

* cited by examiner

Primary Examiner—David Jung
(74) Attorney, Agent, or Firm—Duke W. Yee; David A. Mims, Jr.

(57) ABSTRACT

A method and apparatus in a data system for processing a recursive link in a directory structure in a data processing system. A path to a directory is identified including the recursive link in the directory structure, wherein the path includes a hierarchy towards a root directory, which is a highest directory. Responsive to identifying the path, a highest unprocessed directory in the path is selected as a current directory and all directories in the directory structure beneath the current directory are identified, excluding a directory below the current directory in the path. This step is performed until all directories in the path down to the directory having the recursive link have been processed to form a set of identified directories. All files within the set of directories are identified to form a set of identified files, which then permits backup operations to proceed.

32 Claims, 9 Drawing Sheets

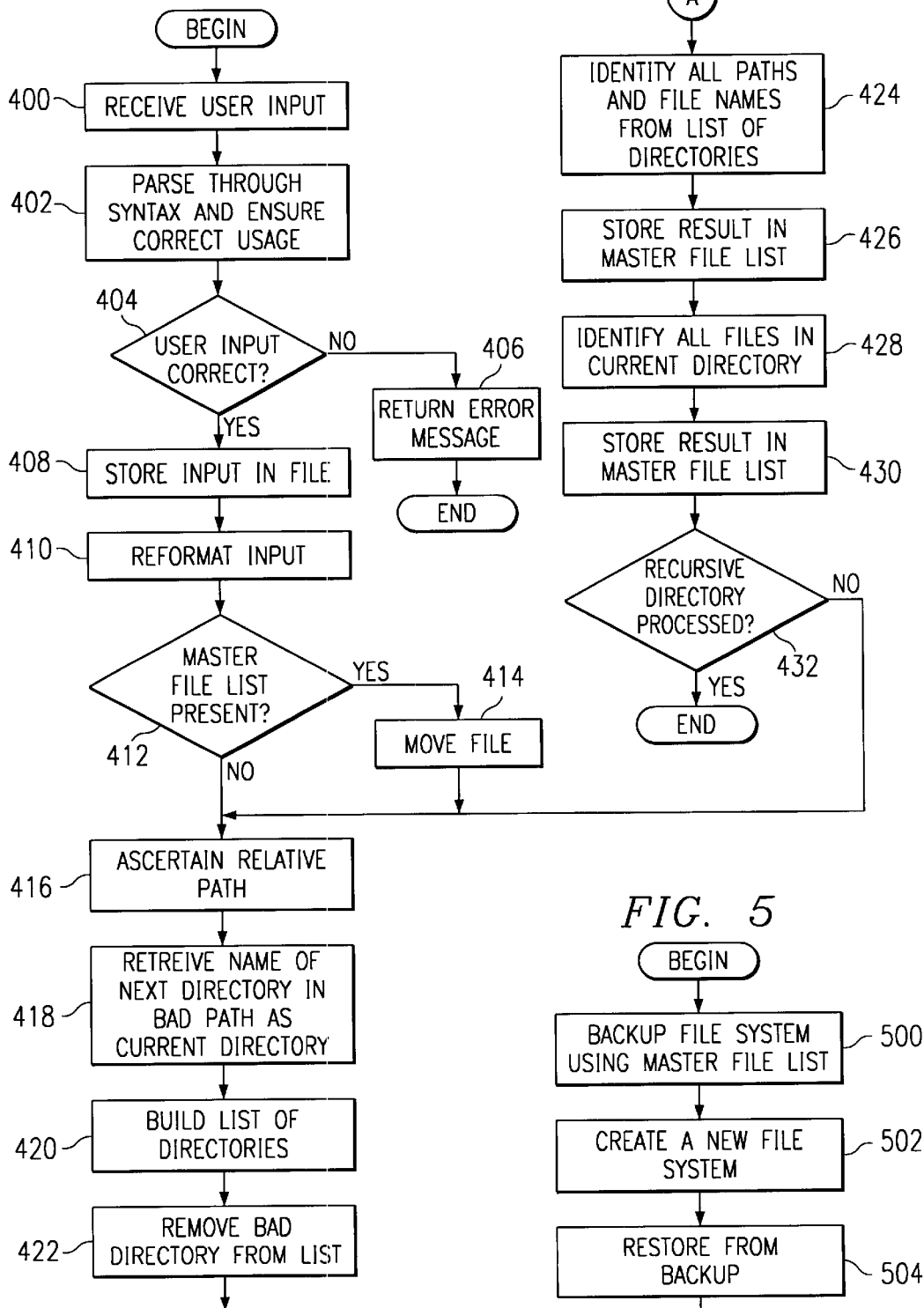

```
#!/bin/ksh
###############################################################
# link_solution.ksh                      Rick Hamilton
# Version 1.0                            IBM Global Services
#                                        512-469-8223
###############################################################

# Copyright Information:  Copyright IBM 1998
#              Controlled Distribution
#              Protected under the procedures, processes, rights
#                 rules, and regulations of
#              IBM Global Services
#              Intellectual Property Management

#              This program is an IBM Type II Deliverable as
#                 described in the IBM Customer Agreement and
#                 relevant IBM services contracts.

#              IBM retains all rights to this program and does not
#                 transfer any rights for replication or distribution
#                 of this program except for the following:
#                    1. Backup/archive copies taken as a normal
#                       course of system maintenance.
#                    2. Copying the program to a similar machine
#                       within the same enterprise.

#              The customer agrees to restrict access to this
#                 program as they would their own proprietary code,
#                 and to notify IBM should unauthorized distribution
#                 occur.

#              This program is distributed on an "as is" basis,
#                 no warranty is expressed or implied.

###############################################################
# Purpose (General) :
# This script is used to gather all file and directory structure
# information surrounding a recursive hard link. It works by
# first gathering all information for the "good" subdirectories,
# then gathering the file-only data for the immediate directory,
# then recursing down one level deeper and repeating. Note that
# this script will handle recursion up to 9 levels deep. It can
# be modified to accommodate higher levels of recursion via straight-
# forward means if needed.

###############################################################
# Version History:
# 1.0
#      - Original working version
###############################################################
```

*FIG. 6A*

```
#################################################################
#          FILE AND VARIABLE DECLARATIONS
#################################################################
home_dir=`pwd`
master_list=/tmp/master.backup.list
file_list=/tmp/file_list
file_list_tmp=/tmp/file_list_tmp
dir_list=/tmp/dir_list
dir_list_tmp=/tmp/dir_list_tmp integer lines_here    # for use in cutting . and .. directories
integer new_lines     # ditto
integer index         # another index variable
integer next_index    # another index variable i=" "                 # text index variable
next_dir=" "          # name of a given directory
dir_name=" "          # name of a given directory
```
⎫
⎬ 600
⎭

```
#################################################################
# Check usage.
#################################################################
if [ $# != 1 ]
then
    echo " "
    echo "Usage:   $0 <recursive path link>"
    echo "   where recursive path link is the directory path below"
    echo "   the current directory where recursion lies.  It should"
    echo "   be of format:"
    echo "        dir_1/dir_2/dir_3/dir_4          (etc)"
    echo "   Script should be executed while sitting in the directory"
    echo "   above that where recursion begins."
    echo " "
    exit 1
fi
```
⎫
⎬ 602
⎭

```
#################################################################
# Issue statement to user...
#################################################################
echo " "
echo "$0 VERSION 1.0"
echo "Copyright IBM Corporation, 1998."
echo " "
```

*FIG. 6B*

```
###############################################################
# The command below will echo the entire subdirectory structure
# specified into a tmp file.
######################################################### echo "$1" > /tmp/link_cleanup_trash.txt                         } 604

#########################################################
# Within the tmp file, replace the / signs with spaces.
######################################################### sed "s/\// /g" /tmp/link_cleanup_trash.txt > /tmp/link_cleanup_dirs.txt  } 606

#########################################################
# If an old master_list exists, move it to the side...
######################################################### if [ [ -w $master_list ] ]
then
    mv $master_list $master_list.old                            } 608
fi

###############################################################
# Move into the starting position and set our index variable.
######################################################### cd $home_dir
index=1          # say we are at first level directory          } 610

###############################################################
# The idea below is to keep looping, once for each directory
# that has a real, non-null value.
######################################################### for dir_name in `cat /tmp/link_cleanup_dirs.txt`
do                                                              } 612
        ###############################################################
        # Let's build up the complete path name for the current dir.
        ###############################################################
```

*FIG. 6C*

```
if [ $index -eq 1 ]
then
    dir_1=$dir_name elif [ $index -eq 2 ]
then
    dir_2=$dir_name
    dir_name=$dir_1/$dir_name elif [ $index -eq 3 ]
then
    dir_3=$dir_name
    dir_name=$dir_1/$dir_2/$dir_name elif [ $index -eq 4 ]
then
    dir_4=$dir_name
    dir_name=$dir_1/$dir_2/$dir_3/$dir_name elif [ $index -eq 5 ]
then
    dir_5=$dir_name
    dir_name=$dir_1/$dir_2/$dir_3/$dir_4/$dir_name elif [ $index -eq 6 ]
then
    dir_6=$dir_name
    dir_name=$dir_1/$dir_2/$dir_3/$dir_4/$dir_5/$dir_name elif [ $index -eq 7 ]
then
    dir_7=$dir_name
    dir_name=$dir_1/$dir_2/$dir_3/$dir_4/$dir_5/$dir_6/$dir_name elif [ $index -eq 8 ]
then
    dir_8=$dir_name
    dir_name=$dir_1/$dir_2/$dir_3/$dir_4/$dir_5/$dir_6/$dir_7/$dir_name elif [ $index -eq 9 ]
then
    dir_4=$dir_name
    dir_name=$dir_1/$dir_2/$dir_3/$dir_4/$dir_5/$dir_6/$dir_7/$dir_8/$dir_name
fi
```
⎫
⎬ 614
⎭

*FIG. 6D*

```
##################################################################
# let's now pull out the name of the next directory, since this
# will be the bad one, for which we do NOT want to issue a find
# command.
############################################################ next_index=$index+1
next_dir=$ (cat /tmp/link_cleanup_dirs.txt | cut -f $next_index -d " ")

#echo "dir_name is $dir_name"
  #echo "next_dir is $next_dir"                                    } 616
  #echo "index is $index"
  #echo "Press return to continue"
  #read

##################################################################
# Gather directory info for all subdirectories BENEATH
# $dir_name first.  This is stored into /tmp/directorylist
############################################################ echo "Building directory list for $dir_name."
ls -al $home_dir/$dir_name | grep ^d | cut -c 55- >$dir_list_tmp #to get list of directories } 618

##################################################################
# Remove the bad directory, "$next_dir," from directorylist.
############################################################ echo "Removing bad directories from list."
cat $dir_list_tmp | grep -v "$next_dir" > $dir_list
mv $dir_list $dir_list_tmp lines_here=`cat $dir_list_tmp | wc -l`                              } 620
new_lines=$lines_here-2 tail -n $new_lines $dir_list_tmp > $dir_list

############################################################
# We now have a list of all subdirs beneath $dir_name, except for
# the bad directory case.  Move to $home_dir to run the following.
############################################################ cd $home_dir echo "Generating master list from directory list."
for i in `cat $dir_list`                                            } 622
do
   find ./$dir_name/$i -print >> $master_list
done
```

*FIG. 6E*

```
###############################################################
# We now need to gather file information for all files directly
# beneath $dir_name.
###############################################################
```

624 ⎰ echo "Gathering file information for $dir_name."
    ⎪ ls -al $home_dir/$dir_name | grep -v ^d | cut -c 55- >$file_list_tmp #to get list of files
    ⎪ cat $file_list_tmp | cut -f 1 -d " " > $file_list
    ⎪
    ⎨ for i in `cat $file_list`
    ⎪ do
    ⎪    echo "./$dir_name/$i" >> $master_list
    ⎩ done

```
###############################################################
# We now have gathered file information for those files
# directly below this directory.
###############################################################
```

626 ⎰    index=$index+1   # Remember that we've increased by one dir
    ⎩ done

628 ⎰ echo " "
    ⎪ echo "Done with directory structure.  Perform backup and restore"
    ⎨ echo "using the file $master_list as input!"
    ⎩ echo " "

*FIG. 6F*

METHOD AND APPARATUS FOR PROCESSING RECURSIVE HARD LINKS IN A DATA PROCESSING SYSTEM

BACKGROUND OF THE INVENTION

1. Technical Field

The present invention relates generally to an improved data processing system and in particular to a method and apparatus for processing errors in a data structure in a data processing system. Still more particularly, the present invention relates generally to a method and apparatus for handling recursive hard links in a directory structure in a data processing system.

2. Description of Related Art

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of a modern state-of-the-art data processing system often become overwhelming in magnitude and complexity.

In today's information systems environment, recovery from computer problems whether from hardware or software difficulties, or from administrator error needs to be accomplished quickly and effectively. The first two error classes, hardware and software, are well documented, as computer solutions evolve with both platform advances and the introduction of inadvertent program errors. The later problem type, administrator error, is one which would not be a concern in a perfect world, but which unfortunately occurs all too often. The problem of recursive link creation has stemmed from the actions of inexperienced system administrators as they try to create soft, symbolic links. In particular, the creation of such links, using the UNIX command "ln-s" is standard fare, and is executed often. The purpose of this command is to create a "soft" link pointing to another file or directory, such that the latter entity can be accessed through the symbolic link. A vastly different command, "link" also exists within the UNIX world. This latter command actually redirects the inodes, the file indexing pointers, to physically point at the file or directory in question. The difference between the two commands can be illustrated by comparing the effects of deleting a soft or hard link. If a symbolic link "d" is created to another file "a", then the link "d" is deleted, the file "a" remains intact. That is to say that only the link is deleted. If a hard link "d" is created to another file "a", then the link "d" is deleted, the file "a" is also deleted.

Returning back to the fundamental problem, what happens when a recursive hard link, connecting a low-level directory to a higher-level directory, is inadvertently created? The result can be a directory chain like: /usr/a/b/c/d/a/b/c/d/a/b/c/d . . . where "d" has a hard link back to directory "a". The first inclination in such a case is to try to unlink "a" from "d". This operation, once the link is created, is not permitted by many UNIX operating system varieties. One solution which has been used in the past is to move one level above "d", the bad link, and unlink form directory "c". This operation is permitted by Advance Interactive Executive (AIX), an operating system from International Business Machines Corporation, although it has unpleasant implications. Any other files and/or directories beneath directory "c" would be lost, in addition to the undesired hard link. For example, if the directory structure /a/b/c/d housed a corporate web site, comprising over 10,000 files and the content beneath "c" alone totaled 2,000 files, these 2,000 files could not be accessed and would normally be lost. Losing 2,000 files to save the filesystem is an unattractive option. To complicate matters, the nature of a recursive hard link prohibits standard backups from being accomplished. Any backup command, from "mksysb" to more selective techniques, will use a "find" command to explore the depths of the directory structure. However, the "find" command will never return from such an infinite structure. Such a situation may crash a data processing system when trying to run backups because the mksysb process may create a rootvg map, a map file, that fills up the entire hard disk, resulting in subsequent system failures. As a result, in such a situation, a back up of some files in the file system cannot be made.

Therefore, it would be advantageous to have an improved method and apparatus for handling recursive links.

SUMMARY OF THE INVENTION

The present invention provides a method and apparatus in a data system for processing a recursive link in a directory structure in a data processing system. A path to a directory is identified including the recursive link in the directory structure, wherein the path includes a hierarchy towards a root directory, which is a highest directory. Responsive to identifying the path, a highest unprocessed directory in the path is selected as a current directory and all directories in the directory structure beneath the current directory are identified, excluding a directory below the current directory in the path. This step is performed until all directories in the path down to the directory having the recursive link have been processed to form a set of identified directories. All files within the set of directories are identified to form a set of identified files, which then permits backup operations to proceed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart of a process for processing a recursive link depicted in accordance with a preferred embodiment of the present invention;

FIG. 5 is a flowchart of a process for creating a new file system without the recursive link depicted in accordance with a preferred embodiment of the present invention; and FIGS. 6A–6F are diagrams illustrating a script used to process recursive links depicted in accordance with a preferred embodiment of the present invention.

DETAILED DESCRIPTION OF THE PREFERRED EMBODIMENT

Figure 1:
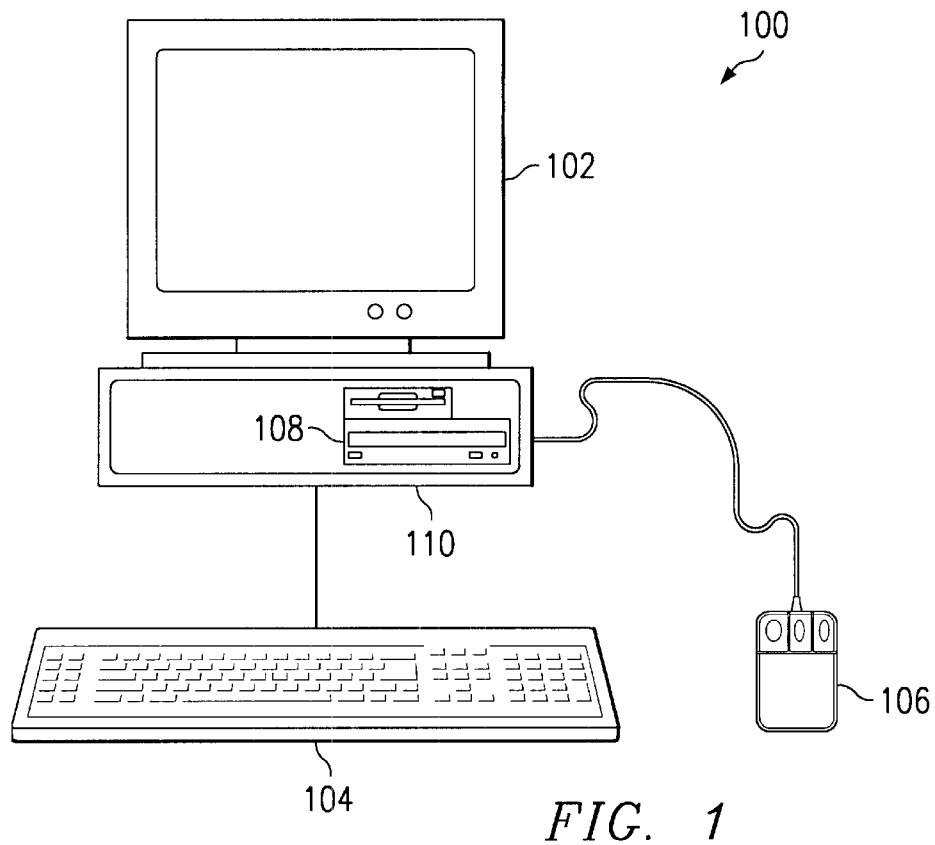
FIG. 1 is a pictorial representation depicting a data processing system in which the present invention may be implemented in accordance with a preferred embodiment of the present invention.

With reference now to the figures and in particular with reference to FIG. 1, a pictorial representation depicting a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of systems software residing in computer readable media in operation within computer 100.

Figure 2:
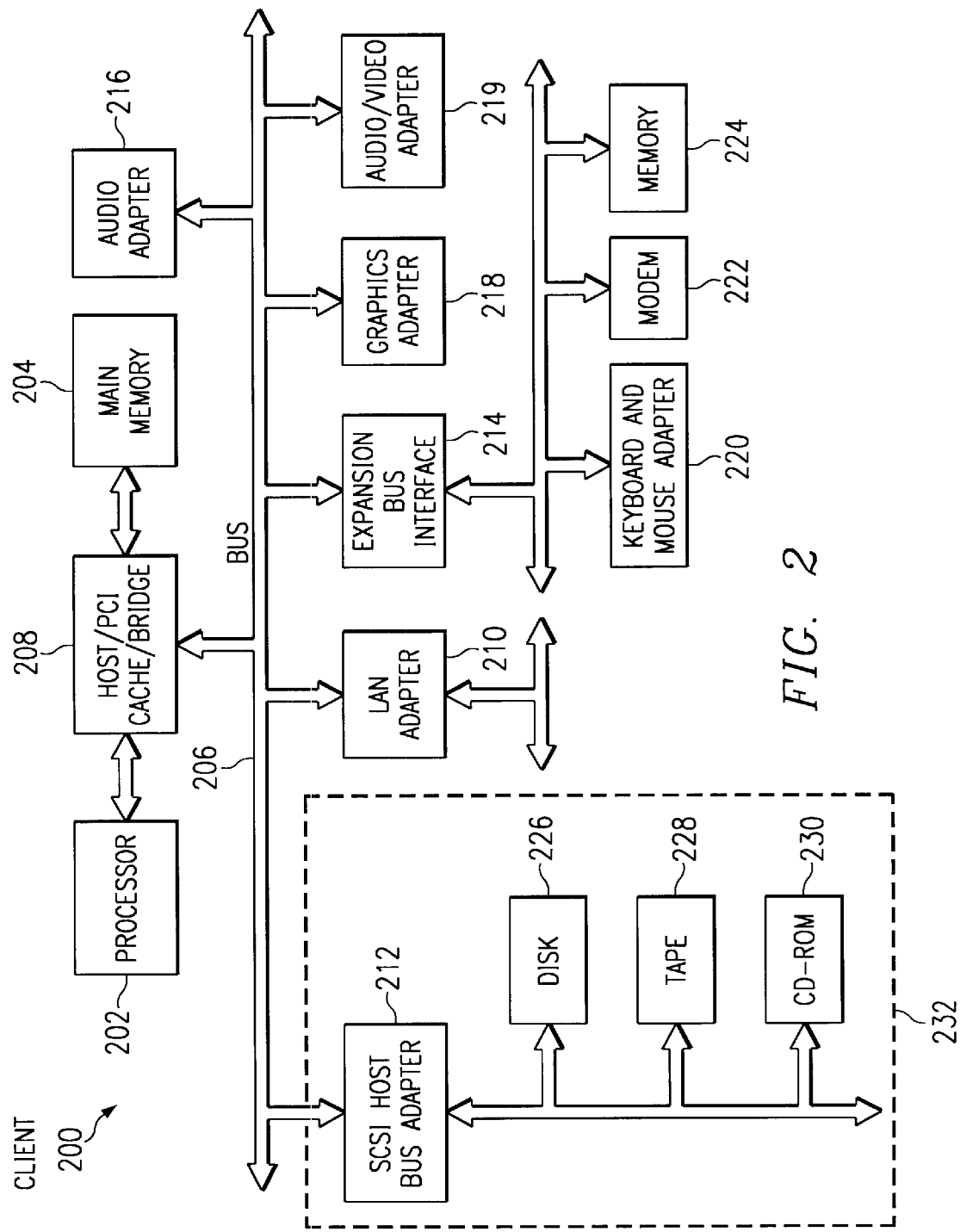
FIG. 2 is a block diagram illustrating a data processing system in which the present invention may be implemented.

With reference now to FIG. 2, a block diagram illustrates a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations.

The present invention provides a method, apparatus, and instructions for processing recursive links. In particular, the present invention is directed towards the processing of recursive hard links or other links that cannot be or are not easily unlinked. Beginning at the highest level directory above the recursive link, in the sample case /usr/, a list of all subdirectories directly beneath it is built. Examples would be, /usr/a, /usr/another_dir, /usr/yet_another$_{13}$dir, or /usr/guess_what_another_dir. Then from the resultant list, the directory leading to the bad link in the sample case, directory "a" is removed. Next, formatting is performed such that this list contains only crisply stated subdirectory data with no extraneous characters. The next step is to run a "find" command with the "print" option against the resultant list with the bad link removed to begin building a "master list" of all files beneath the "good" subdirectories. The master list may appear as, /usr/another_dir, /usr/another_dir/file_a, /usr/another_dir/file_b, /usr/another_dir/subdir, /usr/another_dir/subdir/file_c, etc.

The names of all the files explicitly at this directory level are captured and placed into a temporary file, such as, for example, /usr/file_1, /usr/file_2, etc. In this example, file_1 and file_2 are files at the directory level. Thereafter, formatting is performed on the temporary files to eliminate extraneous characters. Next, the resultant filename list is written into the master list. Then, the process progresses one directory level down toward the bad link. In the depicted example, this progression is into directory "a". A determination is made as to whether the process has progressed all the way down to the bad link. If not, the next lower subdirectory in the path is processed as described above for directory "a". In particular, the steps described above would be performed with respect to directory "b".

After stepping through the above process all the way down to the origin of the recursive link, a back up of the filesystem may be made, minus the bad link. This back up is made using the information placed in the master list. A new filesystem can then be created and data restored from the back up. Then, the contents of the new filesystem may be verified. After inspection of filesystem equivalency minus the bad link, the mount points of the two filesystems may be switched, such that the changes will be transparent to applications and users.

Figure 3:
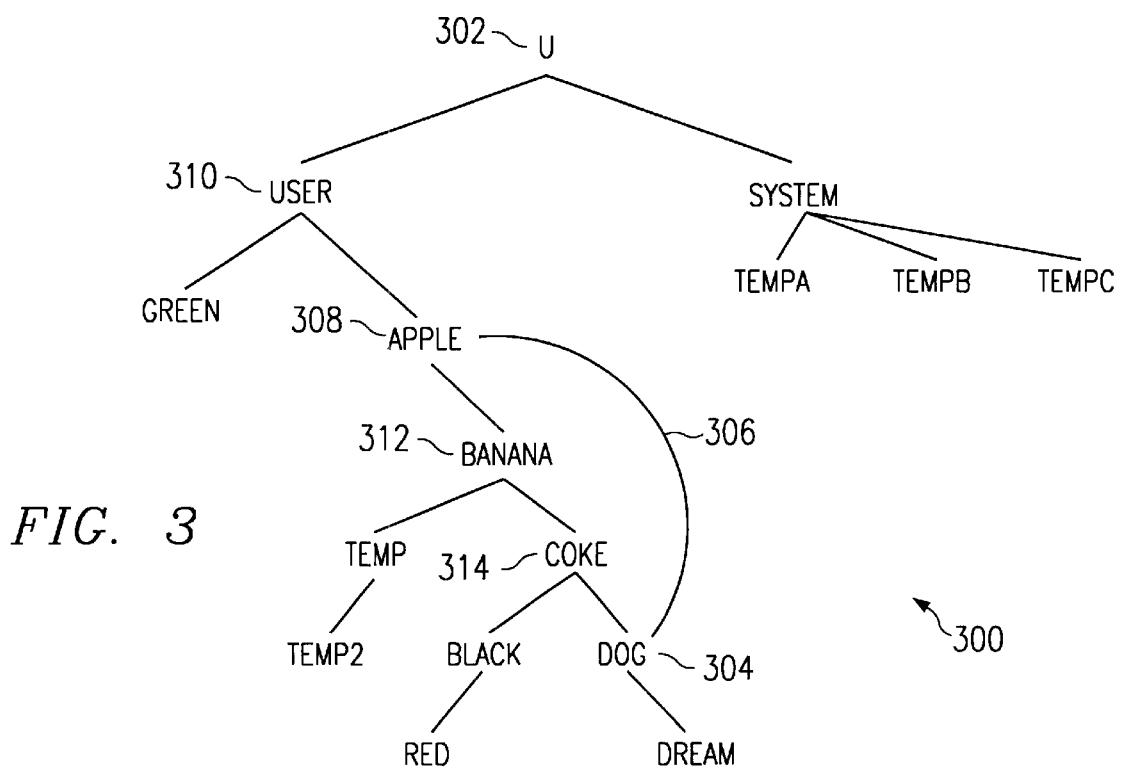
FIG. 3 is a diagram illustrating a directory structure depicted in accordance with a preferred embodiment of the present invention.

With reference now to FIG. 3, a diagram illustrating a directory structure is depicted in accordance with a preferred embodiment of the present invention. Directory structure 300 is an example of a filesystem with U 302 being the root directory. In this example, directory dog 304 is the directory having a hard cursive link 306 back to directory apple 308. The process of the present invention would identify the path to the bad directory, 304. In the depicted example, this path would be U 302, user 310, apple 308, banana 312, coke 314, and dog 304. All of the directories would be placed in a master file list except for any directories below dog 304, which contains a recursive link back to apple 308. The search process involves starting at the top of directory structure 300 and capturing file names and subdirectories down the top branches of directory structure 300.

The process then moves further down the identified path and record names and subdirectories of all files for intermediate branches. The search for files and directories, however, would exclude a subdirectory in the identified path. When a search is conducted down a "good" subdirectory, i.e., one which is not on the bad path, the search is made through the depths of the good subdirectory. It does this before any further steps down the bad path are taken. Once all of the data has been recorded in the master file list, a back up of the identified files and directories may be made, excluding the bad link.

With reference next to FIG. 4, a flowchart of a process for processing a recursive link is depicted in accordance with a preferred embodiment of the present invention. The process begins by receiving user input identifying the bad path containing the recursive link (step 400). In the depicted example, is in a standard "/dir1/dir2/dir3 . . . " format. The path is identified based on user input. Of course, this input may be received from a program analysis of the filesystem. Thereafter, the syntax is parsed to ensure correct usage(step 402). A determination is then made as to whether the user input was correct (step 404). If the user input is incorrect, an error message is returned (step 406) with the process terminating thereafter. Otherwise, the process stores the input in a file for further manipulation (step 408). Then, the input in the file is reformatted to replace each "/" with " "(step 410).

A determination is then made as to whether a prior master file list is present (step 412). If a prior master file list is present, this file list is moved to a different extension (step 414), such as *.old, in case the file is to be examined at a later time. Thereafter, the relative path is ascertained (step 416). In ascertaining the relative path, the current directory being processed is identified. For example, if the current directory is "a" in the path "a/b/c/d", "a" is the relative path. The process proceeds directly to step 416 from step 412 if a prior master file list is absent.

Next, the name of the next directory down the bad path is retrieved as the current directory (step 418). For example, in the path "a/b/c/d" if "a" was the relative path, "b" is the name of the directory that will be the current directory. A list of directories beneath the current directory is identified (step 420). The directory beneath the current directory in the bad path is removed from the list (step 422). For example, if "b" is the current directory, then "c" would be removed from the directory list.

Thereafter, all paths and file names are identified from the list of directories (step 424). This may be performed by using a search command on the list of directories. The result is stored in a master file list (step 426). All files located in the current directory are identified (step 428). This result is stored in the master file list (step 430). A determination is then made as to whether the recursive directory has been processed (step 432). Step 432 is used to stop processing just above the recursive directory so that the bad link is avoided. Files in the recursive directory, however, are processed. The recursive directory is the directory containing the recursive link. If the recursive directory has not been processed, the process returns to step 416 as described above. Otherwise, the process terminates. This master file will describe the entire directory structure, minus the bad links.

Turning next to FIG. 5, a flowchart of a process for creating a new file system without the recursive link is depicted in accordance with a preferred embodiment of the present invention. The process begins by creating a back up using the master file list (step 500). Thereafter, a new file system is created (step 502). The data from the backup is restored to the new file system (step 504). The restored data recreates the directory structure without the bad links. The restored data is verified (step 506) with the process terminating thereafter.

The processes described in FIGS. 4 and 5 are with respect to UNIX. Of course, these processes may be applied to other types of operating systems, such as, for example, OS/2 from International Business Machines Corporation and Windows NT from Microsoft Corporation.

With reference now to FIGS. 6A–6F, diagrams illustrating a script used to process recursive links are depicted in accordance with a preferred embodiment of the present invention. The script illustrated in these diagrams is designed for UNIX, but the processes performed by the script may be applied to other operating systems to handle recursive links.

The script illustrated in these figures begins by providing file and variable declarations in section 600 in FIG. 6B. In FIG. 6B, the syntax and usage of the user input are checked in section 602. In FIG. 6C, section 604, the instructions will echo or write the entire subdirectory structure into a temporary file. Reformatting of the file occurs in section 606 of the script. This section replaces "/" characters with spaces. In section 608, a prior master file list, if present is moved.

In section 610, the script will set the first level directory. Section 612 is the beginning of a loop for processing directories in the file system. In FIG. 6D, a complete path name is built for the current directory in section 614 of the script. In FIG. 6E, the name of the next directory in the path entered by the user is pulled out in section 616 of the script. Directory information for all subdirectories beneath the current directory are gathered and stored into a directory list by the instructions in section 618 of the script. Any bad directories are removed from the directory list by the instructions in section 620. In section 622 of the script, the master directory list is generated from the directory list. In FIG. 6F, file information for files in the current directory are gathered by the script instructions in section 624. The index is then incremented by the script in section 626 to process the next level in the filesystem. A message is sent to the user by the instructions in section 628 when the process has completed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. For example, although the depicted examples are illustrated in a UNIX operating system, the processes of the present invention may be applied to other operating systems to handle recursive links, such as NT Windows. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data system for processing a recursive link in a directory structure in a data processing system, the method comprising the data processing system implemented steps of:

identifying a path to a directory including the recursive link in the directory structure, wherein the path includes a hierarchy towards a root directory, which is a highest directory;

responsive to identifying the path, selecting a highest unprocessed directory in the path as a current directory and identifying all directories in the directory structure beneath the current directory excluding a directory below the current directory in the path until all directories in the path down to the directory having the recursive link have been processed to form a set of identified directories; and identifying all files within the set of identified directories to form a set of identified files.

2. The method of claim 1 further comprising:

performing a backup of the directory structure using the set of identified directories and the set of identified files.

3. The method of claim 1, wherein the directory structure is a file system.

4. The method of claim 3, wherein the file system is a UNIX file system.

5. The method of claim 1, wherein the recursive link is a hard recursive link.

6. The method of claim 1, wherein the step of identifying all files occurs as the step of identifying all directories occurs.

7. The method of claim 1, wherein the step of identifying all files occurs after the step of identifying all directories occurs.

8. The method of claim 1, wherein the step of identifying a path to the recursive link in the directory structure comprises receiving the path as a user input.

9. The method of claim 8 further comprising:

responsive to receiving the path as a user input, parsing through syntax of the input to determine whether the path is in a correct format.

10. The method of claim 1 further comprising:

performing a backup using the set of files and the set of directories, wherein the backup avoids the recursive link; and creating a new directory structure using the backup.

11. The method of claim 10 further comprising:

verifying contents of the new directory structure.

12. A method in a data system for processing a recursive link in a directory structure in a data processing system, the method comprising the data processing system implemented steps of:

identifying a path to a defective directory associated with the recursive link in the directory structure;

responsive to identifying the path to the defective directory associated with the recursive link, collecting directory structure information excluding the recursive link to form collected directory structure information;

backing up data using the collected directory structure information; and creating a new directory structure using the collected directory structure information, wherein the recursive link is absent from the new directory structure.

13. The method of claim 12, wherein the path includes a hierarchy towards a root directory, which is a highest directory, wherein the step of collecting directory structure information includes:

responsive to identifying the path, selecting a highest unprocessed directory in the in path as a current directory and identifying all directories in the directory structure beneath the current directory excluding a directory below the current directory in the path until all directories in the path down to the directory having the recursive link have been processed to form a set of identified directories; and identifying all files within the set of directories to form a set of identified files.

14. The method of claim 12, wherein the recursive link is a hard recursive link.

15. The method of claim 12, wherein the directory structure is a file system.

16. A data system for processing a recursive link in a directory structure in a data processing system, the data processing system comprising:

first identifying means for identifying a path to a directory including the recursive link in the directory structure, wherein the path includes a hierarchy towards a root directory, which is a highest directory;

selecting means, responsive to identifying the path, for selecting a highest unprocessed directory in the path as a current directory and identifying all directories in the directory structure beneath the current directory, excluding a directory below the current directory in the path until all directories in the path down to the directory having the recursive link have been processed to form a set of identified directories; and second identifying means for identifying all files within the set of directories to form a set of identified files.

17. The data processing system of claim 16 further comprising:

performing means for performing a backup of the directory structure using the set of identified directories and the set of identified files.

18. The data processing system of claim 16, wherein the directory structure is a file system.

19. The data processing system of claim 18, wherein the file system is a UNIX file system.

20. The data processing system of claim 16, wherein the recursive link is a hard recursive link.

21. The data processing system of claim 16, wherein the means of identifying all files occurs as the means of identifying all directories occurs.

22. The data processing system of claim 16, wherein the means of identifying is initiated after the identifying of all directories occurs.

23. The data processing system of claim 16, wherein the identifying means comprises receiving means for receiving the path as a user input.

24. The data processing system of claim 23 further comprising:

parsing means, responsive to receiving the path as a user input, for parsing through syntax of the input to determine whether the path is in a correct format.

25. The data processing system of claim 16 further comprising:

performing means for performing a backup using the set of files and the set of directories, wherein the backup avoids the recursive link; and creating means for creating a new directory structure using the backup.

26. The data processing system of claim 25 further comprising:

verifying means for verifying contents of the new directory structure.

27. A data system for processing a recursive link in a directory structure in a data processing system, the data processing system comprising:

identifying means for identifying a path to a defective directory associated with the recursive link in the directory structure;

collecting means, responsive to identifying the path to the defective directory associated with the recursive link, for collecting directory structure information excluding the recursive link to form collected directory structure information;

backing up means for backing up data using the collected directory structure information; and creating means for creating a new directory structure using the collected directory structure information, wherein the recursive link is absent from the new directory structure.

28. The data processing system of claim 27, wherein the path includes a hierarchy towards a root directory, which is a highest directory, wherein the means of collecting directory structure information includes:

selecting means, responsive to identifying the path, for selecting a highest unprocessed directory in the in path as a current directory and identifying all directories in the directory structure beneath the current directory excluding a directory below the current directory in the path until all directories in the path down to the directory having the recursive link have been processed to form a set of identified directories; and second identifying means for identifying all files within the set of directories to form a set of identified files.

29. The data processing system of claim 27, wherein the recursive link is a hard recursive link.

30. The data processing system of claim 27, wherein the directory structure is a file system.

31. A computer program product in a computer readable medium for processing a recursive link in a directory structure in a data processing system, the computer program product comprising:

first instructions for identifying a path to a directory including the recursive link in the directory structure, wherein the path includes a hierarchy towards a root directory, which is a highest directory;

second instructions, responsive to identifying the path, for selecting a highest unprocessed directory in the path as a current directory and identifying all directories in the directory structure beneath the current directory excluding a directory below the current directory in the path until all directories in the path down to the directory having the recursive link have been processed to form a set of identified directories; and third instructions for identifying all files within the set of identified directories to form a set of identified files.

32. A computer program product in a computer readable medium for processing a recursive link in a directory structure in a data processing system, the computer program product comprising:

first instructions for identifying a path to a defective directory associated with the recursive link in the directory structure;

second instructions, responsive to identifying the path to the defective directory associated with the recursive link, for collecting directory structure information excluding the recursive link to form collected directory structure information;

third instructions for backing up data using the collected directory structure information; and fourth instructions for creating a new directory structure using the collected directory structure information, wherein the recursive link is absent from the new directory structure.

* * * * *